US009267590B2

(12) United States Patent
Essig

(10) Patent No.: US 9,267,590 B2
(45) Date of Patent: Feb. 23, 2016

(54) HYDROSTATIC DRIVE

(75) Inventor: Heinz-Gerhard Essig, Lonsee (DE)

(73) Assignee: Robert Bosch GmbH, Stuttgart (DE)

( * ) Notice: Subject to any disclaimer, the term of this patent is extended or adjusted under 35 U.S.C. 154(b) by 444 days.

(21) Appl. No.: 13/990,907

(22) PCT Filed: Nov. 11, 2011

(86) PCT No.: PCT/EP2011/005670
§ 371 (c)(1),
(2), (4) Date: Aug. 7, 2013

(87) PCT Pub. No.: WO2012/072185
PCT Pub. Date: Jun. 7, 2012

(65) Prior Publication Data
US 2013/0305702 A1 Nov. 21, 2013

(51) Int. Cl.
*F16H 39/00* (2006.01)
*B60K 17/356* (2006.01)
*B60K 23/08* (2006.01)
*F03C 1/047* (2006.01)
*F16H 61/4104* (2010.01)
*F16H 61/4165* (2010.01)
*B60K 7/00* (2006.01)

(52) U.S. Cl.
CPC .............. *F16H 39/00* (2013.01); *B60K 17/356* (2013.01); *B60K 23/08* (2013.01); *F03C 1/047* (2013.01); *F03C 1/0476* (2013.01); *F16H 61/4104* (2013.01); *F16H 61/4165* (2013.01); *B60K 7/0015* (2013.01)

(58) Field of Classification Search
CPC .... B60K 17/356; B60K 23/08; B60K 7/0015; F16H 61/4104; F16H 61/4165; F16H 61/439; F16H 61/4069; F16H 39/00; F03C 1/0476; F03C 1/047

USPC .................................... 60/420, 484; 180/247
See application file for complete search history.

(56) References Cited

U.S. PATENT DOCUMENTS

| 3,902,566 | A | 9/1975 | Bird |
| 3,981,374 | A | 9/1976 | Johns, Jr. |
| 6,367,572 | B1 | 4/2002 | Maletschek et al. |
| 2009/0313985 | A1 | 12/2009 | Heren et al. |

FOREIGN PATENT DOCUMENTS

| DE | 39 26 354 A1 | 2/1991 |
| DE | 42 12 983 C1 | 5/1993 |
| DE | 10 2004 061 861 B4 | 6/2008 |
| EP | 1 443 220 B1 | 8/2004 |

OTHER PUBLICATIONS

International Search Report corresponding to PCT Application No. PCT/EP2011/005670, mailed Feb. 9, 2012 (German and English language document) (5 pages).

*Primary Examiner* — Dwayne J White
*Assistant Examiner* — Logan Kraft
(74) *Attorney, Agent, or Firm* — Maginot, Moore & Beck LLP

(57) ABSTRACT

A hydraulic additional drive includes a hydraulic or having working ports configured to be connected to a pump via a high pressure branch and a low pressure branch. The hydraulic motor further includes a purging port to which a feed pressure is configured to be applied to set a "free-wheel mode" while the working ports are connected to a tank. The pressure at the purging port is limited to a comparatively low value between the feed pressure and the tank pressure by a pre-charging valve integrated into the hydraulic motor. The pre-charging valve is arranged in a free-wheel duct which hydraulically connects the purging port to one of the working ports.

15 Claims, 4 Drawing Sheets

HYDROSTATIC DRIVE

This application is a 35 U.S.C. §371 National Stage Application of PCT/EP2011/005670, filed on Nov. 11, 2011, which claims the benefit of priority to Serial No. DE 10 2010 053 105.7, filed on Dec. 1, 2010 in Germany, the disclosures of which are incorporated herein by reference in their entirety.

BACKGROUND

The disclosure relates to a hydrostatic drive.

Such hydrostatic drives are used, for example, in the case of commercial vehicles as an additional drive for the front wheels, while the rear axle is driven via a conventional mechanical drivetrain.

Such a commercial vehicle with conventional and hydraulic drivetrain is explained, for example, in DE 42 12 983 C2. In the case of this solution, the hydraulic drivetrain can, where necessary, be connected via a valve arrangement, wherein each wheel of the front axle is assigned a hydraulic motor which is supplied with pressurizing medium via a variable displacement pump which can be pivoted across zero in order to drive the front wheels. The known system is furthermore embodied with a retarder via which the brake system of the commercial vehicle are hydraulically assisted during braking.

One disadvantage of this solution is that both in the case of the retarder function and in the drive function, the pressurizing medium is heated to a significant extent in the hydraulic drivetrain which forms a closed circuit. A further disadvantage of this solution lies in the fact that, in the case of a disconnected hydraulic drivetrain, the hydraulic motors run along with the wheels of the rear axle and thus increase the fuel consumption as a result of the friction inherent therein.

In order to avoid the first disadvantage mentioned above, DE 39 26 354 C2 describes a hydraulic motor which is embodied with a flushing valve in order to remove a proportion of the pressurizing medium from the closed circuit and feed it back to a tank from which the removed quantity is balanced out via a feed pump. In this manner, excessive heating of the pressurizing medium can be reliably avoided.

In order to avoid the second disadvantage mentioned above, a vehicle with a conventional mechanical drivetrain and a hydraulic drivetrain is explained in U.S. Pat. No. 6,367,572 B1. Here, a hydraulic motor is assigned to both wheels of the front axle and is of a radial piston design. Such a radial piston machine has a plurality of pistons supported on a lifting ring, which plurality delimits a working chamber, wherein the working chambers are consecutively connected to high pressure and low pressure in order to drive the hydraulic motor. When disconnecting the hydraulic drivetrain, it is moved into a "freewheel mode" in the case of which tank pressure or a comparatively low pressure acts on the working chambers, while a feed pressure or another pressure which is greater than the tank pressure acts on the lifting ring—or on the housing side. The differential pressure which results from the higher housing pressure brings about a "retraction" of the pistons so that they lift off from the lifting ring and thus the friction is reduced in the case of a disconnected hydraulic drivetrain. In the case of adjustment of the pressure difference via the piston, it must be ensured that the pressure difference which is active in the lifting-off direction is so large that it holds the pistons in the lifting-off position counter to the centrifugal forces which are active during rotation.

It is disadvantageous in the case of this solution on the one hand that a comparatively high pressure is active in the housing if the hydraulic drivetrain is moved into the freewheel mode. Moreover, in the case of this known solution, the pressurizing medium can heat up since in turn no housing flushing is provided.

Against this background, the object of the disclosure is to create a hydrostatic drive which enables operation in the "freewheel mode" with minimal effort and in the case of which heating of pressurizing medium can be largely avoided.

This object is achieved by a hydrostatic drive with the features of the disclosure.

Advantageous further developments of the disclosure are the subject matter of the subordinate claims.

SUMMARY

The hydrostatic drive according to the disclosure has at least one hydraulic motor, the working connections of which formed on a motor housing can be connected via a high pressure and a low pressure branch to a pump and the pistons of which can be acted upon on one hand by a housing pressure and on the other hand with low pressure or with pump pressure. On the housing side, a flushing connection which can be connected to a tank is provided. Moreover, the hydrostatic drive has a feed line for conveying pressurizing medium to the low-pressure side and a valve arrangement via which tank pressure can act on the two working connections and a feed pressure can act on the flushing connection via a feed pressure line in order to set a freewheel mode. According to the disclosure, the motor housing is thus embodied with three connections, the two working connections and the flushing connection. A freewheel passage is formed in the motor housing, which passage connects the flushing connection and one of the working passages connected to one of the working connections and in which a counterbalance valve which opens towards this connection is arranged, which counterbalance valve opens in the case of a substantially lower pressure than the feed pressure.

On the hydraulic motor side, only three connections must thus be present. The housing flushing during the "freewheel mode" is carried out via the freewheel passage and the counterbalance valve so that heating of the pressurizing medium can be prevented.

The solution according to the disclosure is accordingly of an extremely compact design and makes it possible to flush the motor housing, operate the hydraulic motor in the freewheel mode and furthermore restrict the number of incoming and outgoing lines to a minimum, concretely three line portions.

In the case of one exemplary embodiment of the disclosure, a throttle for restricting the flow of pressurizing medium from the feed line to the feed pressure line is provided in the feed line.

The counterbalance valve has a particularly simple design if it is embodied as a spring-pretensioned non-return valve, wherein the spring rate of the spring defines the pretensioning.

The valve arrangement has, in the case of one exemplary embodiment, a sequence valve which, in one position, connects the two working connections to the tank and, in another position, connects the working connections to the high pressure or low pressure side of the pump.

The sequence valve can be assigned a shift valve which acts on a control face which is active in one direction of the second position of the sequence valve, in one position, with tank pressure and, in the other position, with feed pressure in order to move the sequence valve. The shift valve connects, in the first position, an outlet connection of the sequence valve to a connection line which itself can be connected to the tank or the feed pressure line.

In the case of one variant of the disclosure, the sequence valve is embodied as a 5/2-way valve with an outlet connection connected to low pressure or an inlet connection connected to high pressure, two consumer connections and a tank connection which can be connected to the tank.

The shift valve can be embodied as a 4/2-way valve which, in a basic position, connects the control face to the tank and the tank connection of the sequence valve to the connection line and, in one shift position, connects the tank connection to the tank and the control face to the connection line.

The drive can be embodied with an activation valve which, in one position, connects the feed pressure line to the tank and, in a different position, connects the feed pressure line to the feed line and the connection line to the tank.

It is preferable to embody the activation valve as a 4/2-way valve which is pretensioned into one position and can be switched into the other position.

In the case of one variant of the disclosure, the drive has a crossover valve which, in one position, connects the low pressure branch to the high pressure branch and, in a different shift position, blocks this connection.

Filling of the hydraulic motor is particularly fast if the feed pressure or low pressure lies significantly above 10 bar, while the spring pretensioning of the non-return valve is significantly below this but greater than the tank pressure.

The hydraulic motor of the drive is preferably embodied with a flushing valve integrated into the motor housing, which flushing valve can be moved into an opening position by a pressure difference between the high pressure and the low pressure branch in order to transfer a connection from the outlet-side working connection to the flushing connection and downstream of which a pressure retention valve with a nozzle is connected, which pressure retention valve can be moved into an opening position when a threshold pressure in the low pressure branch is exceeded.

The flushing valve can be embodied, for example, as a 3/3-way valve with a spring-pretensioned basic position and two shift positions in which in each case one of the working passages is connected to the flushing connection.

In the case of one exemplary embodiment, the drive is embodied as a traction drive for a vehicle axle of a commercial vehicle, wherein a hydraulic motor is assigned to each wheel of this axle. The other axle can here be driven with a conventional mechanical drive.

BRIEF DESCRIPTION OF THE DRAWINGS

A preferred exemplary embodiment of the disclosure is explained in greater detail below on the basis of schematic drawings. In these drawings.

DETAILED DESCRIPTION

Figure 1:
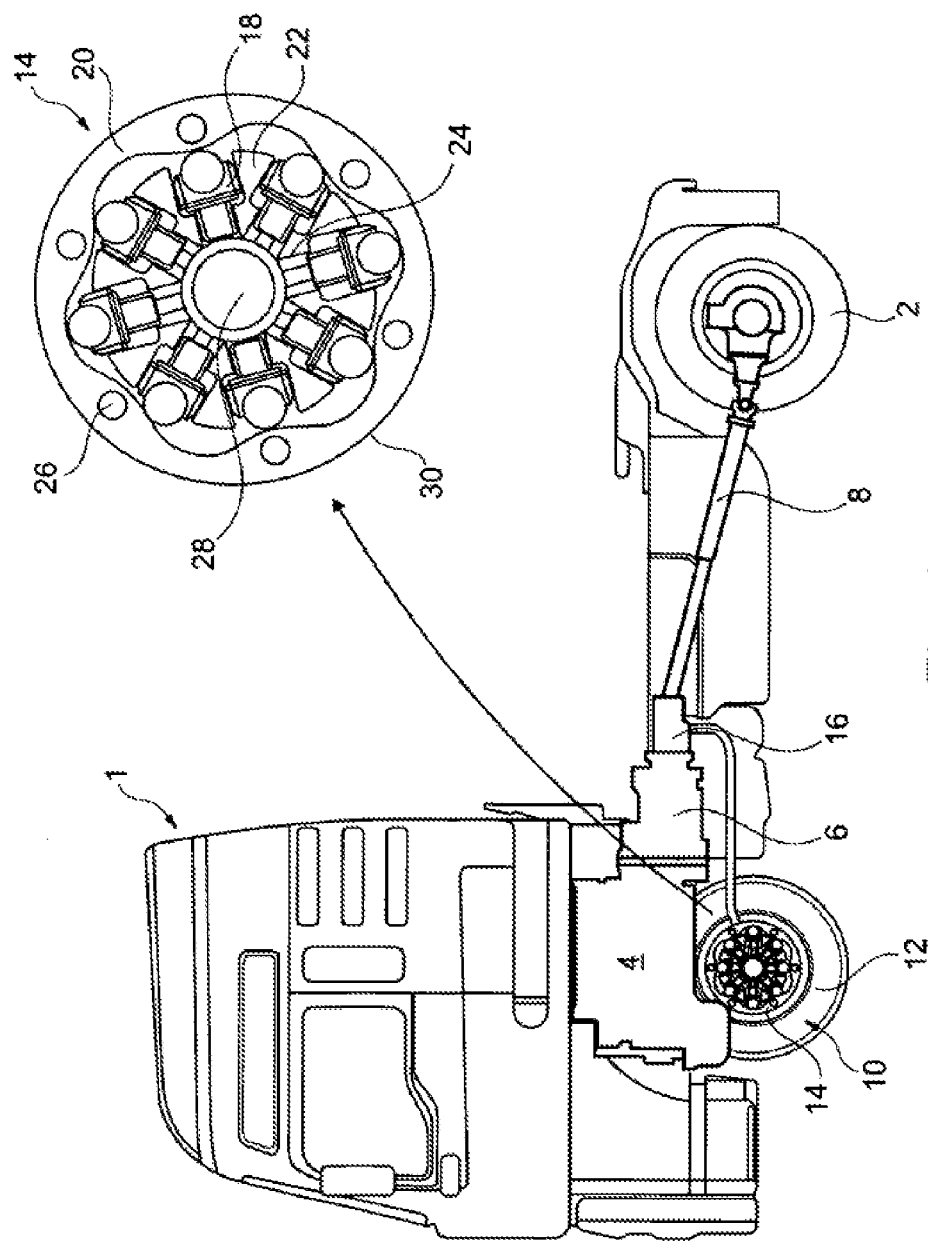
FIG. 1 shows a highly simplified schematic diagram of a commercial vehicle with a hydrostatic additional drive according to the disclosure.

FIG. 1 shows a highly schematic representation of a truck 1, rear wheels 2 of which are driven via a conventional mechanical drivetrain with internal combustion engine 4, transmission 6, cardan shaft 8 and differential, etc. Truck 1 is embodied with a hydraulic additional drive 10 which can optionally be activated, for example, on heavy terrain. Said hydraulic additional drive 10 has for each of front wheels 12 a hydraulic motor unit 14 which is supplied with pressurizing medium via a pump 16 driven by internal combustion engine 4.

According to the enlarged partial cutout of hydraulic motor unit 14, this is embodied as an inverse radial piston driving mechanism, wherein a plurality of pistons 18 are supported on a lifting ring 20.

The pistons are guided radially movably in cylinder bores of a cylinder drum 22 and delimit in each case a working chamber 24, wherein this plurality of working chambers are consecutively connected to high pressure and low pressure so that, as a result of the resultant piston stroke, cylinder drum 22 rotates, wherein the pistons slide via piston shoes 26 on lifting ring 20. Cylinder drum 22 is connected in a rotationally conjoint manner to a drive shaft 28 which in practice forms the wheel axle of respective front wheel 12. Hydraulic motor unit 14 forms a type of "wheel bearing" of the respective wheel.

In the position shown, the pistons abut against lifting ring 20 so that significant friction losses occur in the case of an unactuated additional drive 10 and an "idly" running hydraulic motor unit 14. In order to minimize these friction losses, hydraulic motor unit 14 is operated in the freewheel mode described above. To this end, a motor housing 30 which bears lifting ring 20 is acted upon with a pressure explained in greater detail below, for example, a feed pressure, while the working chambers are acted upon with the tank pressure or another lower pressure so that, as a result of the pressure difference, the pistons are retracted in the direction of drive shaft 28 and thus lift off from lifting ring 20 the friction losses are correspondingly significantly reduced.

Figure 2:
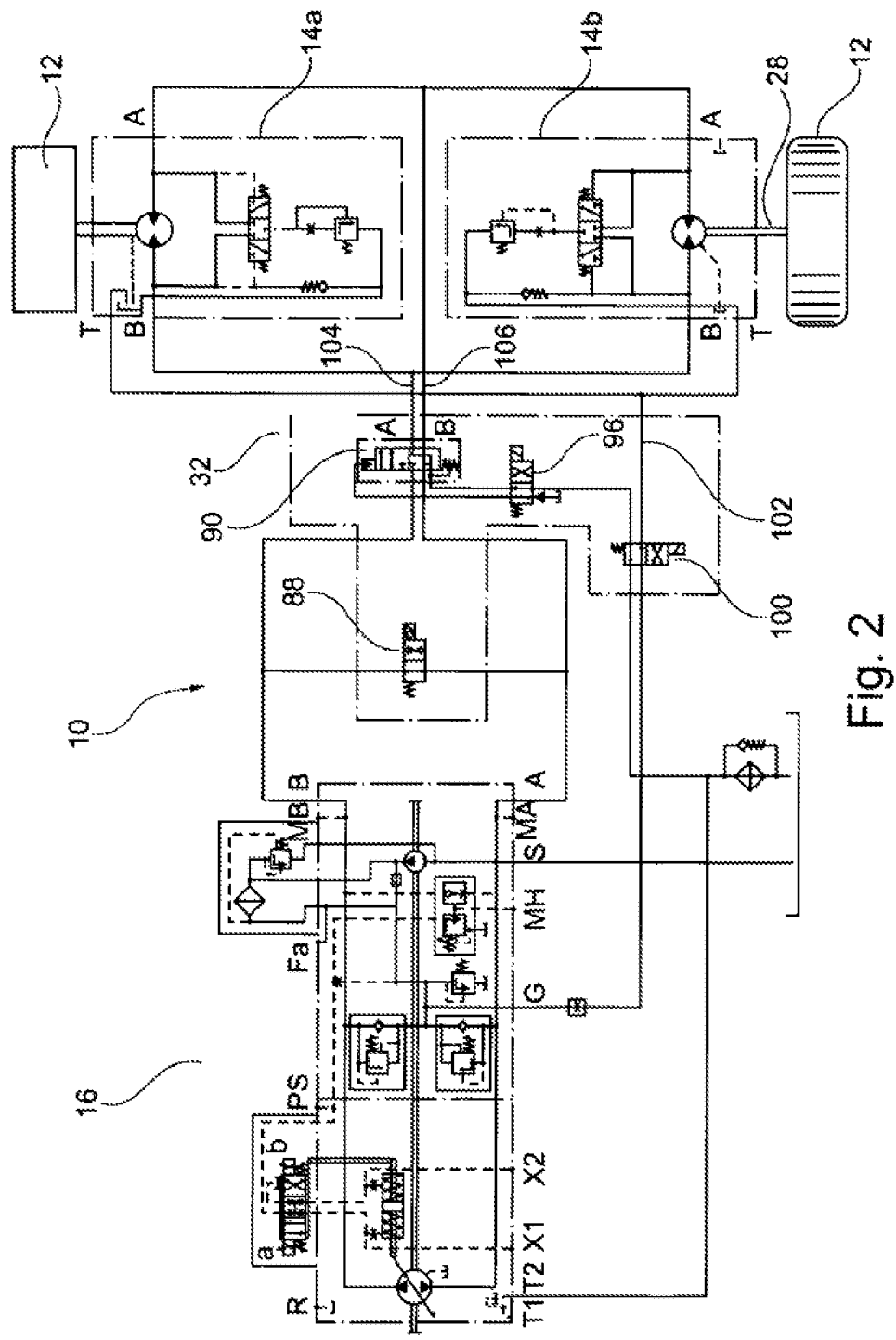
FIG. 2 shows a circuit diagram of the hydrostatic additional drive according to FIG. 1.

FIG. 2 shows the circuit diagram of hydrostatic additional drive 10 from FIG. 1. One can see both front wheels 12 which are driven in each case via a hydraulic motor unit 14a, 14b. The supply of pressurizing medium is carried out via pump assembly 16 which is hydraulically operatively connected via a valve arrangement 32 to hydraulic motor units 14a, 14b.

Figure 3:
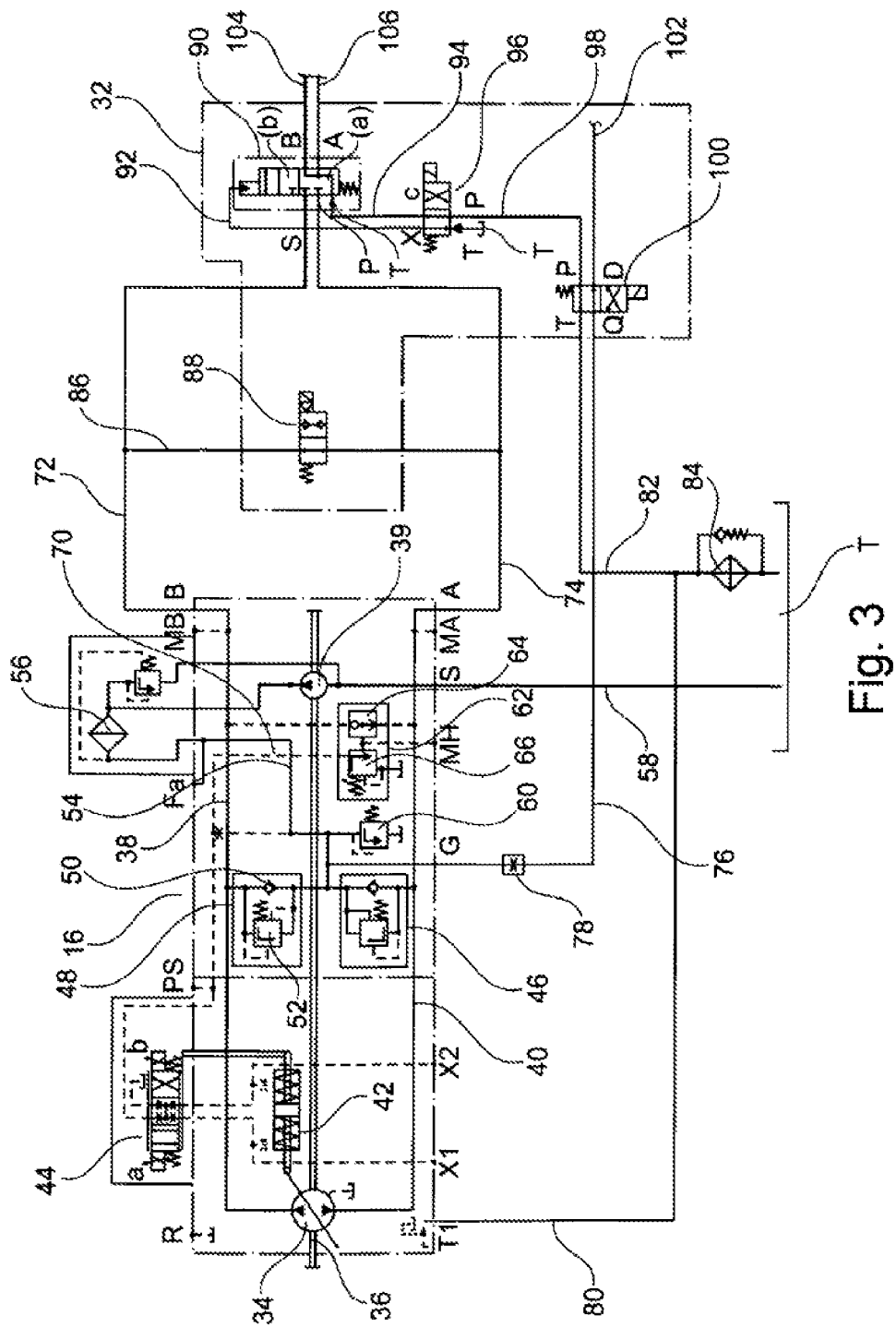
FIG. 3 shows an enlarged representation of a pump assembly.

FIG. 3 shows an enlarged representation of pump assembly 16 and valve arrangement 32.

Pump assembly 16 has a variable displacement pump 34 which is pivotable across zero and is driven by internal combustion engine 4. There sits on the same drive shaft 36 a feed pump 39 via which pressurizing medium is sucked out of a tank T and can be supplied with a feed pressure of, for example, 20 to 30 bar into a low pressure branch of additional drive 10. In the case of the following explanations, it is assumed that a pressure line at the top in FIG. 3 is a low pressure line 38, while a different pressure line connected to a connection of variable displacement pump 34 should be high pressure line 40. Depending on the actuation of variable displacement pump 34, the HP and LP branch can change.

The adjustment of the pivot angle of variable displacement pump 34 is carried out by means of an actuating cylinder 42, the actuating piston of which is connected to a pump control valve 44 which is embodied as a proportional valve actuated via a control electronic unit. Pump assembly 16 is connected via control oil connections X1, X2 to a control oil supply.

Such pressure and conveyance flow control systems for variable displacement pumps 34 are known from the prior art so a detailed explanation can be omitted. In the case of such a pump control valve 44, the setpoint value is specified as an electric variable and, as a function of the actuation of pump control valve 44, adjusts an actuating piston of actuating cylinder 42, wherein the return of the actual position of the actuating piston can be carried out mechanically—as in the present case—or, however, also electrically. The position of the actuating piston is then compared via the control electronic unit with the specified setpoint value which corresponds to a specific conveyance volumetric flow and the actuating piston is adjusted until the setpoint and actual value correspond and thus the required conveyance volumetric flow is set. According to the explanations above, the pressurizing medium is conveyed into high pressure line and flows back from the consumer, in the present case from hydraulic motor units 14*a*, 14*b* in a closed circuit via low pressure line 38 to the low pressure connection of variable displacement pump 34. In terms of further details of pump control, reference is made, for example, to DE 10 2004 061 861 B4.

Pump assembly 16 furthermore has two feed valves 46, 48 via which pressurizing medium can be fed into the respective low pressure branch. Each of these feed valves has in a manner known per se a non-return valve 50 which opens towards in each case a line 38, 40, a pressure limiting valve 52 being connected parallel to valve 50, which valve 52 transfers a pressurizing medium connection to the in each case other pressure line in the case of a predetermined pressure being exceeded in assigned pressure line 38, 40. In terms of the concrete structure of such feed valves 46, 48, reference is also made to DE 10 2004 061 861 B4.

Both input connections of feed valves 46, 48 open out in a feed passage 54 which leads to a filter unit 56, the input connection of which is connected to the pressure connection of feed pump 39. A suction connection of feed pump 39 is connected via a tank connection S and via a suction line 58 to tank T. In the case of actuated feed pump 39, pressurizing medium is conveyed with the feed pressure (20 to 30 bar) through filter unit 56 and feed passage 54 to the inlet of both feed valves 46, 48. Low-pressure side non-return valve 50 then opens so that pressurizing medium is conveyed into the corresponding low pressure branch. The pressure in the high pressure branch is limited via respective pressure limiting valve 52 of feed valve 46, 48 so that the pressure can be reduced towards the low pressure side in the event of this maximum pressure being exceeded.

A feed pressure limiting valve 60 is provided in the feed passage 54 in order to limit the feed pressure to the 20 to 30 bar described above.

Pump assembly 16 furthermore has a pressure cut-off valve unit 62, via which the pressure in the high pressure branch is tapped by means of a shuttle valve 64 and is guided to a control face of a pressure cut-off valve 66, which, in the event of a predetermined maximum pressure being exceeded, connects a control line 70 to tank pressure so that variable displacement pump 34 is adjusted in the direction of a lower conveyance volumetric flow. In terms of further details of such a pressure cut-off valve unit 62, reference is made to DE 10 2004 061 861 B4 which has already been mentioned.

Pump assembly 16 has two working connections A, B which are connected via working lines 72, 74 to valve arrangement 32 explained in greater detail below and to hydraulic motor units 14*a*, 14*b*. Pump assembly 16 furthermore has a feed connection G which is connected via an internal passage to feed passage 54 and to which a feed line 76 with a throttle 78 is connected. A leakage connection T1 is connected via a leakage line 80 to a tank line 82 which leads to tank T and in which a further filter 84 is arranged.

According to FIG. 3, both working connections 72, 74 are connected via a bypass line 86 in which a crossover valve 88 is arranged. This is embodied as an electrically adjustable 2/2-way seat valve which, in a spring-pretensioned basic position, opens bypass line and thus connects both working lines 72, 74 and which can be moved into a blocking position by energizing an electromagnet.

Both working lines 72, 74 are connected to connections of a sequence valve 90; these two connections are provided below with the designations S, P.

Sequence valve 90 is embodied as a 5/2-way valve and is pretensioned via a spring into a basic position (a) in which a tank connection T is connected to two output connections A, B. Both connections S, P are blocked.

By subjecting a control line 92 to a control pressure, sequence valve 90 can be moved into a shift position (b) in which tank connection T is blocked off and connections S, A and P, B are connected to one another.

Connection T is connected via a line 94 to a connection C of a shift valve 96, to whose control connection X control line 92 is connected. Shift valve 96 embodied as a 4/2-way valve furthermore has a tank connection connected to tank T and a connection P which is connected via a connection line 98 to a connection P of an activation valve 100. Shift valve 96 is pretensioned via a spring into a represented basic position in which connections X, T and C, P are connected to one another. Control line 92 and thus assigned control face of sequence valve 90 in this basic position are correspondingly relieved of pressure towards tank T. Both working connections A, B of sequence valve 90 are connected to connection line 98 in which—as stated in greater detail below —either tank pressure or feed pressure is present.

By switching of shift valve 96 counter to the force of the spring, connection P of shift valve 96 is connected to control connection X so that the pressure in connection line 98 is active in control line 92. In the event that the feed pressure then acts in connection line 98, sequence valve 90 is moved into its shift position (b). During switching of shift valve 96, connection C is furthermore connected to tank connection T so that tank pressure acts in line 94.

Activation valve 100 is likewise embodied as a 4/2-way valve and has a working connection D connected to a feed pressure line 102, a tank connection T and a feed pressure connection Q. Tank connection T is connected to tank line 82, while feed pressure connection Q is connected to feed line 76. Activation valve 100 connects, in its represented spring-pretensioned basic position, pressure connection P to tank connection T so that connection line 98 is connected to tank line 82. In this basic position, connections Q, D are furthermore connected to one another so that a pressurizing medium connection is present between feed line 76 and feed pressure line 102. Activation valve 100 is switched by energizing a shift magnet. In this shift position, connections T, D and Q, P are connected to one another. Connection line 98 is then correspondingly connected to feed line 76 and feed pressure line 102 is connected to tank line 82.

According to the circuit diagram in FIG. 2, consumer lines 104, 106 are connected to both working connections A, B of sequence valve 90, which consumer lines 104, 106 are in each case branched and are connected to working connections A or B of hydraulic motor units 14*a*, 14*b*. Feed pressure line 102 is likewise branched and is connected to in each case a flushing connection T of both hydraulic motors 14*a*, 14*b*.

The structure of hydraulic motor units 14*a*, 14*b* is explained with reference to FIG. 4 which shows an enlarged representation of hydraulic motor unit 14*b*. The structure of other hydraulic motor unit 14*a* corresponds with this.

Hydraulic motor unit 14 has a hydraulic motor 108 which could be embodied as an adjustable hydraulic machine and— this exemplary embodiment is, however, not represented—could also act as a pump during braking operation in order to recover the braking energy.

Both connections A, B of hydraulic pump unit 14 are connected via in each case one working passage 110, 112 to inlet connection A or outlet connection B of hydraulic motor 108. The latter furthermore has a connection S which is connected via a flushing passage 114 to flushing connection T. As explained above with reference to FIG. 1, said flushing passage 114 opens out on the housing side so that pistons 18 are subjected to the pressure in flushing passage 114 in the retraction direction. Pump housing 30 is indicated by a dashed line in FIG. 4.

A freewheel passage 116 which connects flushing connection T within pump housing 30 to one of working passages 110, 112, in the present case working passage 110, branches off from flushing connection T or from flushing passage 114. There is provided in freewheel passage 116 a spring-pretensioned non-return valve 118, the spring of which corresponds to a pressure equivalent of approximately 3 bar and which opens towards working passage 110. For opening of non-return valve 118, the pressure which is active upstream of non-return valve 118 must be approximately 3 bar higher than the pressure which acts on the rear side of non-return valve 118.

A passage 120, 122, which is guided to two inlet connections P, P' of a flushing valve 124, furthermore branches off in each case from both working passages 110, 112.

This is embodied as a 3/3-way valve and has an outlet connection C to which a connection passage 126 is connected which opens out into freewheel passage 116 upstream of non-return valve 118.

Flushing valve 124 has a spring-centered central position (0) in which the three connections P, P' and C are blocked off. The pressure in respective passages 120, 122 is tapped via control passages 128, 130 and guided to two opposite control faces of flushing valve 124 so that flushing valve 124 is moved in the direction of a control pressure shift position (a) or (b) depending on the control pressure difference which is present. In shift position (a), connection P' is connected to outlet connection C, while in shift position (b) connection P is connected to outlet connection C. A throttle 132 is provided in connection passage 126. A pressure retention valve 134, which is pretensioned via a spring into a blocking position and can be moved by the pressure upstream of throttle 132 into an opening position, is arranged downstream of said throttle 132.

Said pressure retention valve 134 accordingly only opens if the pressure in connection passage 126 and thus the pressure difference across both working passages 110, 112 has exceeded a threshold value which corresponds to the spring of pressure retention valve 134. The fundamental structure of such a flushing valve is explained in EP 1 443 220 B1, wherein in the case of this variant yet another pressure switch-off valve is provided.

Figure 4:
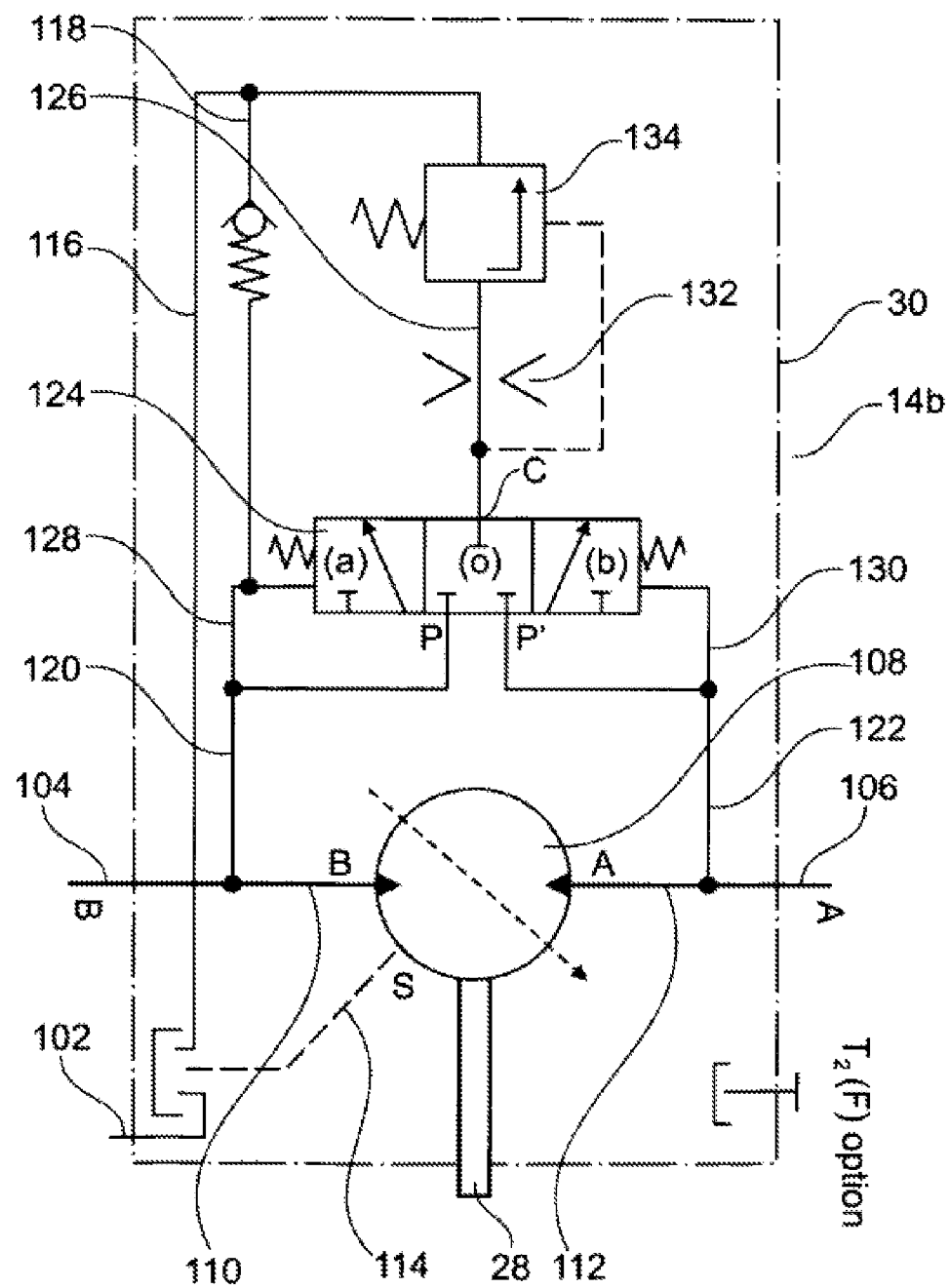
FIG. 4 shows an enlarged representation of a hydraulic motor of the additional drive from FIG. 2.

FIGS. 2, 3 and 4 show the respective elements of hydrostatic additional drive 10 in the free-wheel mode, in which, as explained, pistons 18 are lifted off from lifting ring 120.

To this end, the valves of valve arrangement 32 are located in each case in their spring-pretensioned basic position. Both working connections A, B of sequence valve 90 are accordingly connected via its tank connection T, shift valve 96 and activation valve 100 to tank T. Working lines 72, 74 are furthermore connected to one another via crossover valve 88 and are thus hydraulically bypassed. In the basic position, activation valve 100 furthermore connects feed line 76 embodied with throttle 78 to feed pressure line 102 connected to flushing connection P of pump housing 30 so that the feed pressure correspondingly acts on flushing connection T and thus in flushing passage 114 and actuates the pistons in the retraction direction. As explained above, working passages 110, 112 are relieved of load towards tank T so that the tank pressure is present at the rear side of non-return valve 118. The pressure upstream of non-return valve 118 is correspondingly limited to 3 bar or more precisely to the pressure which corresponds to the pressure equivalent of the spring of non-return valve 118. The pressure difference which is set via piston 18 is sufficient in order to hold these in their retracted position counter to the centrifugal force. In this freewheel mode, drive shaft 36 is continuously driven so that feed pressure is correspondingly also available. Variable displacement pump 34 is retracted here.

In order to switch on additional drive 16, activation valve 100 is initially switched into its shift position in which connections D, T and Q and P are connected to one another. The feed pressure is correspondingly built up in working passages A, B since these are connected via sequence valve 90 and shift valve 96 as well as switched activation valve 100 to feed line 76.

As a result of the switching of activation valve 100, feed pressure line 102 is furthermore connected to tank line 82 so that the housing pressure is relieved towards the tank and pistons 18 abut against lifting ring 20. Both working lines 72, 74 are furthermore hydraulically bypassed via crossover valve 88. This switching on can also be carried out during travel of the traction drive.

In a following sequence, the pivot angle of variable displacement pump 34 is then set in such a manner that the conveying flow of the pump corresponds to the displacement flow of both hydraulic motor units 14a, 14b plus a predetermined displacement flow difference.

As a result, shift valve 96 is then switched so that control line 92 is connected to feed line 76 and thus the feed pressure acts on sequence valve 90 in the switching direction. Sequence valve 90 correspondingly switches so that both working lines 72, 74 are connected to consumer lines 104, 106 and working passages 110, 112 and thus the hydraulic motors are connected to the hydraulic network of the pump. The ultimate switching on is then carried out by switching of bypass valve 88 into its blocking position.

In order to switch off the hydrostatic drive, valves 88, 96/90 and 100 are correspondingly de-energized in this sequence and variable displacement pump 34 is pivoted back so that the "freewheel mode" is in turn set.

A hydraulic additional drive with a hydraulic motor, the working connections of which can be connected via a high pressure branch and a low pressure branch to a pump, is disclosed. The hydraulic motor furthermore has a flushing connection, on which a feed pressure can act for setting of a "freewheel mode", while the working connections are connected to a tank. The pressure at flushing connection is limited via a counterbalance valve integrated into the hydraulic motor to a comparatively low value which lies between the feed pressure and the tank pressure. The counterbalance valve is arranged in a freewheel passage which hydraulically connects the flushing connection to one of the working connections.

The invention claimed is:
1. A hydrostatic drive, comprising:
   at least one hydraulic motor including:
      a motor housing forming working connections configured to be connected via a high pressure branch and a low pressure branch to a pump, and pistons configured to be acted upon by a housing pressure and with low pressure or with pump pressure;

a flushing connection disposed on a housing side and configured to be connected to a tank;

a feed line configured to convey pressurizing medium to the low-pressure side;

a valve arrangement via which tank pressure is configured to act at least on the two working connections and the feed pressure is configured to act on the flushing connection via a feed pressure line to set a freewheel mode;

a freewheel passage formed in the motor housing, the passage connecting the flushing connection and one of the working passages connected to one of the working connections of the hydraulic motor; and a counterbalance valve which is arranged in the passage and which opens towards the working passage, the counterbalance valve opening in the case of a substantially lower pressure than the feed pressure.

2. The drive according to claim 1, wherein a throttle is arranged in the feed line.

3. The drive according to claim 1, wherein the counterbalance valve is a spring-pretensioned non-return valve.

4. The drive according to claim 1, wherein the valve arrangement has a sequence valve which, in one position, connects the two working connections to the tank and, in another position, connects the working connections to the high pressure or low pressure side of the pump.

5. The drive according to claim 4, wherein the sequence valve is assigned a shift valve which acts on a control face which is active in the direction of the second position of the sequence valve, in one position, with tank pressure and, in a different position, with feed pressure and therein, in one position, connects a connection of the sequence valve to a connection line which itself is configured to be connected to the tank or the feed line.

6. The drive according to claim 5, wherein the shift valve is a 4/2-way valve which, in a basic position, connects the control face of the sequence valve to the tank and the connection line to the tank connection of the sequence valve and, in one shift position, connects the tank connection of the sequence valve to the tank (T) and the control face to the connection line.

7. The drive according to claim 4, wherein the sequence valve is a 5/2-way valve with an outlet or inlet connection connected to low pressure or connected to high pressure, two consumer connections, and a tank connection which is configured to be connected to the tank.

8. The drive according to claim 1, further comprising an activation valve which, in one position, connects the feed pressure line to the tank and, in a different position, connects the feed pressure line to the feed line and the connection line to the tank.

9. The drive according to claim 8, wherein the activation valve is a 4/2-way valve which is pretensioned into one position and is configured to be switched into the other position.

10. The drive according to claim 1, further comprising a crossover valve which, in one position, connects the low pressure branch to the high pressure branch and, in a different shift position, blocks this connection.

11. The drive according to claim 1, wherein the feed pressure is significantly above 10 bar, while spring pretensioning of the counterbalance valve is significantly below the feed pressure but greater than the tank pressure.

12. The drive according to claim 1, further comprising:
a flushing valve integrated into the motor housing, the flushing valve being configured to be moved into an opening position by the pressure difference between the high pressure branch and the low pressure branch so as to transfer a connection from the outlet-side working connection to the flushing connection; and
a pressure retention valve connected downstream of the flushing valve, the pressure retention valve including a throttle and being configured to be moved into an opening position by the low pressure.

13. The drive according to claim 12, wherein the flushing valve is a 3/3-way valve with a spring-pretensioned basic position and two shift positions configured in each case to connect the low pressure-side working connection of the hydraulic motor to the flushing connection.

14. The drive according to claim 1, wherein the hydrostatic drive is a traction drive for an axle of a vehicle, and wherein a hydraulic motor is assigned to each wheel.

15. The drive according to claim 14, further comprising a conventional drive for a second axle of the vehicle.

* * * * *

UNITED STATES PATENT AND TRADEMARK OFFICE
CERTIFICATE OF CORRECTION

PATENT NO. : 9,267,590 B2
APPLICATION NO. : 13/990907
DATED : February 23, 2016
INVENTOR(S) : Heinz-Gerhard Essig Page 1 of 1

It is certified that error appears in the above-identified patent and that said Letters Patent is hereby corrected as shown below:

On the title page, the following Foreign Application Priority Data should be included Item (30) Foreign Application Priority Data Dec 1, 2010 (DE) ...................... 10 2010 053 105.7

Signed and Sealed this
Twelfth Day of July, 2016

Michelle K. Lee
*Director of the United States Patent and Trademark Office*